United States Patent
Lewis et al.

(10) Patent No.: US 11,928,138 B2
(45) Date of Patent: Mar. 12, 2024

(54) ACCOUNT ASSOCIATION SYSTEMS AND METHODS

(71) Applicant: VISA EUROPE LIMITED, London (GB)

(72) Inventors: Malcolm Lewis, London (GB); Boris Taratine, London (GB)

(73) Assignee: Visa Europe Limited, London (GB)

( * ) Notice: Subject to any disclaimer, the term of this patent is extended or adjusted under 35 U.S.C. 154(b) by 342 days.

(21) Appl. No.: 15/079,466

(22) Filed: Mar. 24, 2016

(65) Prior Publication Data

US 2016/0203213 A1 Jul. 14, 2016

Related U.S. Application Data

(63) Continuation of application No. PCT/GB2014/052952, filed on Sep. 30, 2014.

(30) Foreign Application Priority Data

Sep. 30, 2013 (GB) ..................................... 1317311

(51) Int. Cl.
*G06F 16/28* (2019.01)
*G06F 16/951* (2019.01)
(Continued)

(52) U.S. Cl.
CPC .......... *G06F 16/288* (2019.01); *G06F 16/951* (2019.01); *G06Q 50/01* (2013.01); *H04L 63/123* (2013.01)

(58) Field of Classification Search
CPC ............. G06F 17/30604; G06F 16/288; G06F 16/951; G06Q 50/01; G06Q 40/02; H04L 63/123
(Continued)

(56) References Cited

U.S. PATENT DOCUMENTS 8,355,955 B1 1/2013 Mirchandani et al.
11,282,139 B1 * 3/2022 Winklevoss ........... G06Q 40/04
(Continued)

OTHER PUBLICATIONS

International Search Report and Written Opinion dated Jan. 23, 2015 for PCT Application No. PCT/GB2014/052952.
(Continued)

*Primary Examiner* — Hicham Skhoun
(74) *Attorney, Agent, or Firm* — Kilpatrick Townsend & Stockton LLP (57) ABSTRACT

Embodiments of the present disclosure comprise methods, apparatus and computer readable instructions for establishing a relationship between user accounts. A first account association request message in relation to a first user account in an account based system is received. A first source account identifier which corresponds to the first user account and a first target account identifier which corresponds to the second user account are identified. A second account association request message in relation to the second user account is received. Based on the second account association request message, a second source account identifier which corresponds to the second user account and a second target account identifier which corresponds to the first user account are identified. Responsive to a determination of whether the source account identifiers and target account identifiers relate to the same user account, a relationship is established between the first user account and the second user account.

6 Claims, 4 Drawing Sheets

(51) Int. Cl.
*G06Q 50/00* (2012.01)
*H04L 9/40* (2022.01)

(58) Field of Classification Search
USPC .......................................................... 707/737
See application file for complete search history.

(56) References Cited

U.S. PATENT DOCUMENTS

| | | | | |
|---|---|---|---|---|
| 2005/0108155 | A1* | 5/2005 | Gallagher | G06Q 40/03 705/39 |
| 2007/0019616 | A1* | 1/2007 | Rantapuska | H04L 12/1822 370/352 |
| 2009/0271287 | A1* | 10/2009 | Halpern | G06Q 20/10 705/26.1 |
| 2010/0042538 | A1* | 2/2010 | Dheer | G06Q 20/223 705/40 |
| 2010/0262932 | A1* | 10/2010 | Pan | H04L 67/22 715/780 |
| 2011/0106675 | A1* | 5/2011 | Perlman | G06Q 20/405 715/764 |
| 2012/0271761 | A1* | 10/2012 | Kight | G06Q 20/12 705/39 |
| 2013/0036112 | A1 | 2/2013 | Poon | |
| 2014/0058965 | A1* | 2/2014 | Ryan | G06Q 50/01 705/319 |
| 2014/0279444 | A1* | 9/2014 | Kassemi | G06Q 20/382 705/39 |
| 2014/0280941 | A1* | 9/2014 | Maguire | H04L 67/10 709/225 |
| 2015/0013000 | A1* | 1/2015 | Linnakangas | H04L 63/168 726/14 |
| 2015/0066743 | A1* | 3/2015 | Gerard | G06Q 20/227 705/39 |
| 2015/0278919 | A1* | 10/2015 | Stoll | G06Q 30/0609 705/26.7 |

OTHER PUBLICATIONS

UKIPO Search Report dated Mar. 10, 2014 for Application No. GB1317311.7.
European Application No. 21160069.7-1218, Office Action dated Jun. 29, 2023, 6 pages.

* cited by examiner

Figure 4

ACCOUNT ASSOCIATION SYSTEMS AND METHODS

CROSS-REFERENCE TO RELATED APPLICATIONS

This application is a continuation of International Application No. PCT/GB2014/052952, filed Sep. 30, 2014, which claims the benefit of UK Application No. 1317311.7, filed Sep. 30, 2013. Each of the above-referenced patent applications is incorporated by reference in its entirety.

BACKGROUND OF THE INVENTION

1. Field of the Invention

The present invention relates to account based systems, and in particular to establishing relationships between user accounts in an account based system.

2. Description of the Related Technology

Many systems exist in which users of the system are required to hold accounts. Examples of such account based systems include financial institutions, such as banks, where users are commonly required to hold an account with which their level of funds or other financial data is associated. Similarly, many internet based services require users to hold accounts in order to use the service. Examples of such services include social networks and other online communities. Association between two or more user accounts is a desirable feature of many account based systems. Such account associations may be short-term, or persistent. In the case of banking systems, a user's account may include a list of payee accounts to which they can more easily transfer funds. In the case of an online community, association between user accounts may enable the transfer of data between the users of the associated accounts, such as communications data or shared data files. In some account based systems, due to the functionality provided by an association of user accounts, it may be appropriate to provide one user with a level of assurance in the identity of another user before establishing such an association between their user accounts. The level of assurance that it is appropriate to provide may depend on the functionality provided by an association of user accounts. However, establishing trusted relationships between user accounts can be difficult, especially in systems where there is a requirement not to expose a user's account details or profile information to users of other accounts.

Some known account based systems use account identifiers that are not easily recognizable to users of the system. For example, in the context of banking systems, accounts are typically identified to other users on the basis of unique account numbers, or account number and sort code combinations. Such systems expose users to the risk of transposition errors when adding another user to their list of payees, because errors made when entering such an account identifier may not be readily noticeable to the user. Despite some systems employing mechanisms for detecting transposition errors, there remains a risk that such errors may result in failure of payments, or payments being made to unintended recipients, which are clearly undesirable.

Alternative known systems may utilize more generic identifiers, such as user configurable account names. For example, in the context of social networks, a user may have the option of associating a publicly available "display name" with their account. However, in order to allow users to use the display name that they desire, such identifiers are typically not unique within the account based system. Such systems may expose their users to the risk of targeted identity spoofing, whereby an account may be established by a malicious party in order to solicit association requests from users intending to associate with the legitimate user account. In other words, it may be difficult to provide a user with an account identifier for their user account that is easily recognizable by others, and that is unique and genuine. Relationships that are unintentionally established with a spoofed account may lead to the unwanted acquisition of private data, or other valued assets, by the malicious party.

Hence it would be desirable to provide measures for establishing a relationship between user accounts that overcome one or more of these problems.

SUMMARY

In accordance with embodiments of the present invention, there is provided a method, apparatus and computer software for establishing a relationship between a first user account and a second user account in an account based system according to the appended claims.

More specifically, in a first aspect, there is provided a method for establishing a relationship between a first user account and a second user account in an account based system, the method comprising: receiving a first account association request message in relation to the first user account, the first account association request message comprising account identification data corresponding to the second user account; identifying, on the basis of the first account association request message, a first source account identifier which corresponds to the first user account and a first target account identifier which corresponds to the second user account; receiving a second account association request message in relation to the second user account, the second association message comprising account identification data corresponding to the first user account; identifying, on the basis of the second account association request message, a second source account identifier which corresponds to the second user account and a second target account identifier which corresponds to the first user account; determining that at least one of: the first source account identifier and the second target account identifier relates to the same user account in the account based system; and the second source account identifier and the first target account identifier relates to the same user account in the account based system; and responsive thereto, establishing a relationship between the first user account and the second user account.

In this way, a trusted relationship may be established between the first and second user accounts, without requiring any information about either of the corresponding users to be revealed to the other user.

In some arrangements, in response to receipt of the first account association request message, an account association query message is transmitted, and thereafter the second account association request message is received in response to transmission of the account association query message. In these arrangements, once a first account association request message has been received, a corresponding account association request message may be requested from the user of the target user account. In this manner, delays associated with waiting for the second account association request message to be submitted may be avoided, thereby enabling the account association process to be completed more quickly.

In embodiments, a token process may be performed in respect of one of the first user account and the second user account, the token process comprising: receiving, prior to receipt of one or more of the first account association request message and the second account association request message, a token request message in relation to the one of the first user account and the second user account; and transmitting a token response message in response to receipt of the token request message, said token request message comprising a token corresponding to the one of the first user account and the second user account.

The use of tokens makes it more difficult for malicious users to transmit unsolicited account association request messages, because a user requires the other user's token to be able to do so.

In some arrangements, at least a portion of the token is encrypted, meaning that there is no need for a user to disclose their actual account details, which the user may prefer to keep private, during an exchange of account identification information.

In some arrangements, at least a portion of the token is signed. Hence, the authenticity of the token can be ensured, and/or non-repudiation provided.

The token may comprise a timestamp relating to at least one of the date and the time that the token was generated. In this way, use of the token may be time-limited and thereby reduce the risk of a malicious party obtaining a usable token.

In some embodiments, the first user account and the second user account are each held with a financial institution. Hence, a relationship may be established between financial accounts that permits, for example, the transfer of funds between the financial accounts.

In further aspects, there is provided a method for establishing a relationship between a first user account and a second user account in an account based system, the method comprising, at a user device associated with the first user account: receiving, from a user device associated with the second user account, an account identification message comprising account identification data corresponding to the second user account; receiving, subsequent to receipt of the account identification message, an account association query message from a network entity in the account based system; and transmitting, in response to receipt of the account association query message, an account association request message to a network entity in the account based system, the account association request message relating to the first user account and comprising the received account identification data corresponding to the second user account.

Hence, a trusted relationship may be established between the first and second user accounts, without requiring any information about either of the corresponding users to be revealed to the other user.

According to yet further aspects, there are provided apparatus for establishing relationships between user accounts in an account based system according to one or more of the aforesaid methods, and computer programs, comprising a set of instructions, which, when executed by a computing device, cause the computing device to perform steps of one or more of the aforesaid methods. In embodiments, the apparatus comprises at least one processor, and at least one memory including computer program code, the at least one memory and the computer program code being configured to, with the at least one processor, cause the apparatus to perform steps of one or more of the aforesaid methods.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

The present disclosure leverages a mutual exchange of account identification data to provide measures for establishing trusted relationships between user accounts in the account based system.

Figure 1:
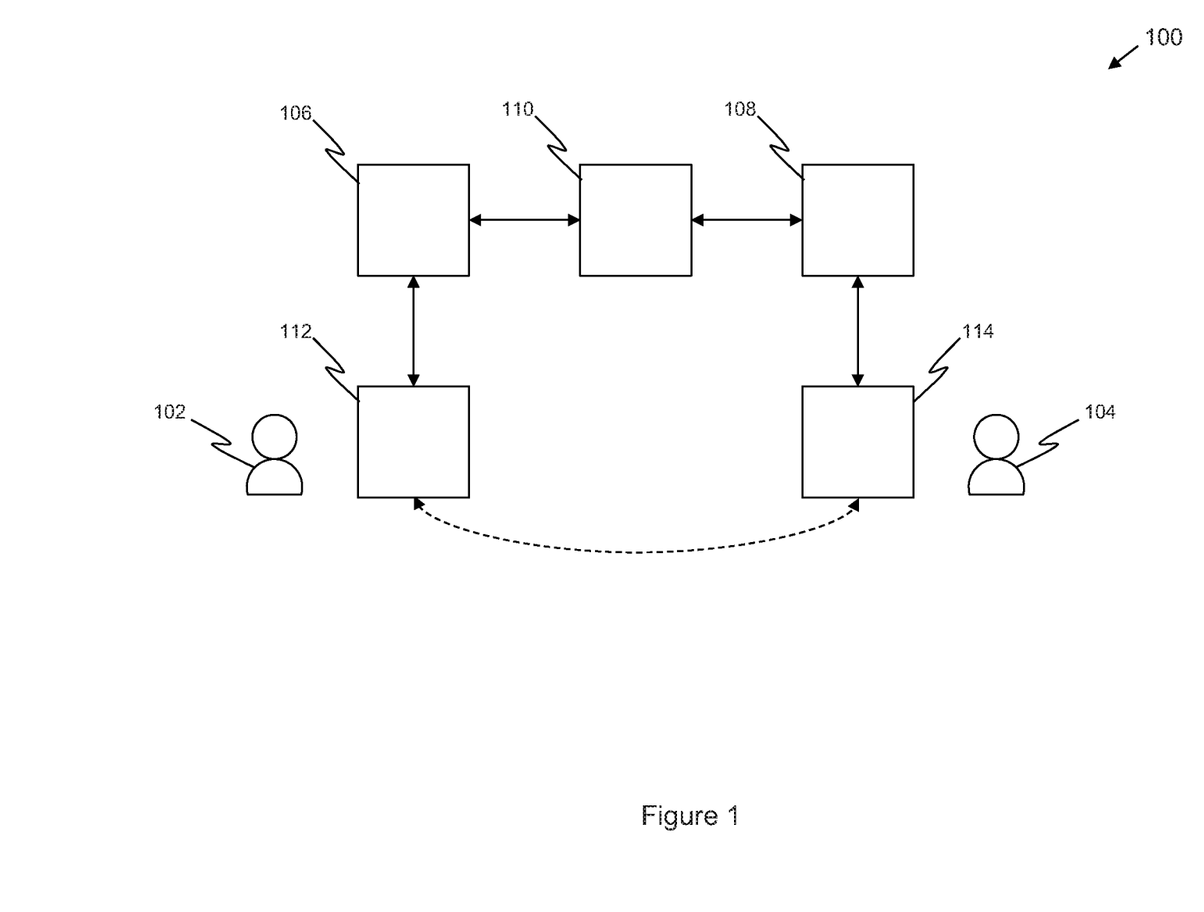
FIG. 1 shows an example account based system in which embodiments of the present disclosure may be practiced.

FIG. 1 illustrates an example account based system 100 in which embodiments of the present disclosure may be practiced. Users 102 and 104 each hold accounts within the account based system 100. In the embodiments depicted in FIG. 1, user 102 holds an account with service provider entity 106, whereas user 104 holds an account with service provider entity 108. In alternative embodiments, users 102 and 104 may both hold accounts with the same service provider entity. Service provider entities 106 and 108 may, for example, correspond to financial service providers, such as banks. In such embodiments, the user accounts may be banking accounts. Alternatively, service provider entities 106 and 108 may correspond to internet based service providers, such as social networks or other internet based communities. In such embodiments, the user accounts may be referred to as user profile accounts. In some embodiments, service provider entities 106 and 108 may correspond to medical service providers, in which case the account based system may provide for the transfer of medical record data between user accounts. In embodiments, service provider entities 106 and 108 are each embodied by a server, or group of servers, associated with the corresponding service provider.

Service provider entities 106 and 108 are capable of conducting communications with account association entity 110. Service provider entities 106 and 108 may communicate with account association entity 110 via a public network such as the internet, a virtual private network and/or via a dedicated communication channel. According to embodiments, account association entity 110 is embodied by a server, or group of servers.

User 102 may access their user account with service provider entity 106 via one or more user devices, including user device 112. User 102 may be associated with user device 112 by virtue of owning the user device, subscribing to services for user device 112, or merely by operating user device 112. In alternative embodiments, user 102 may access their user account with service provider entity 106 in person at a geographical location associated with the service provider, such as a branch of a banking institution. User devices may include any devices capable of conducting communications via a network, including, for example, personal computers, laptop computers, mobile telephones (including smartphones), personal digital assistants (PDAs) tablet computers, and smart watches. User device 112 is capable of communicating with service provider entity 106 via a communications network such as the internet to access the user account associated with user 102. Similarly, user 104 may access their user account with service provider entity 108 via one or more user devices, including user device 114. User device 114 is capable of communicating with service provider entity 108 via a communications network such as the internet to access the user account associated with user 104. In order to access their user accounts, users 102 and 104 may be required to complete an authentication (or "log in") procedure via their associated user device in order to prove their identities to the respective service providers.

User devices 112 and 114 are also capable of conducting communications with each-other via a further communication channel, as illustrated by the broken line in FIG. 1. This communication channel may for example comprise a packet-based network such as the internet or a local area network (including wired and/or wireless protocols, such as Ethernet and Wi-Fi™ respectively), a cellular communications network such as a mobile telephone network, a short range wireless communications channel such as a Bluetooth™ or near field communications (NFC) channel, an audio transmission and reception channel (for example including a loudspeaker and microphone), an optical recognition channel (for example comprising the display of computer recognizable images and their capture via a camera) or a person-to-person communication channel (which may for example involve a verbal exchange of information between the respective users 102 and 104, and manual input of the exchanged information into the respective user device via an appropriate user interface).

Figure 2:
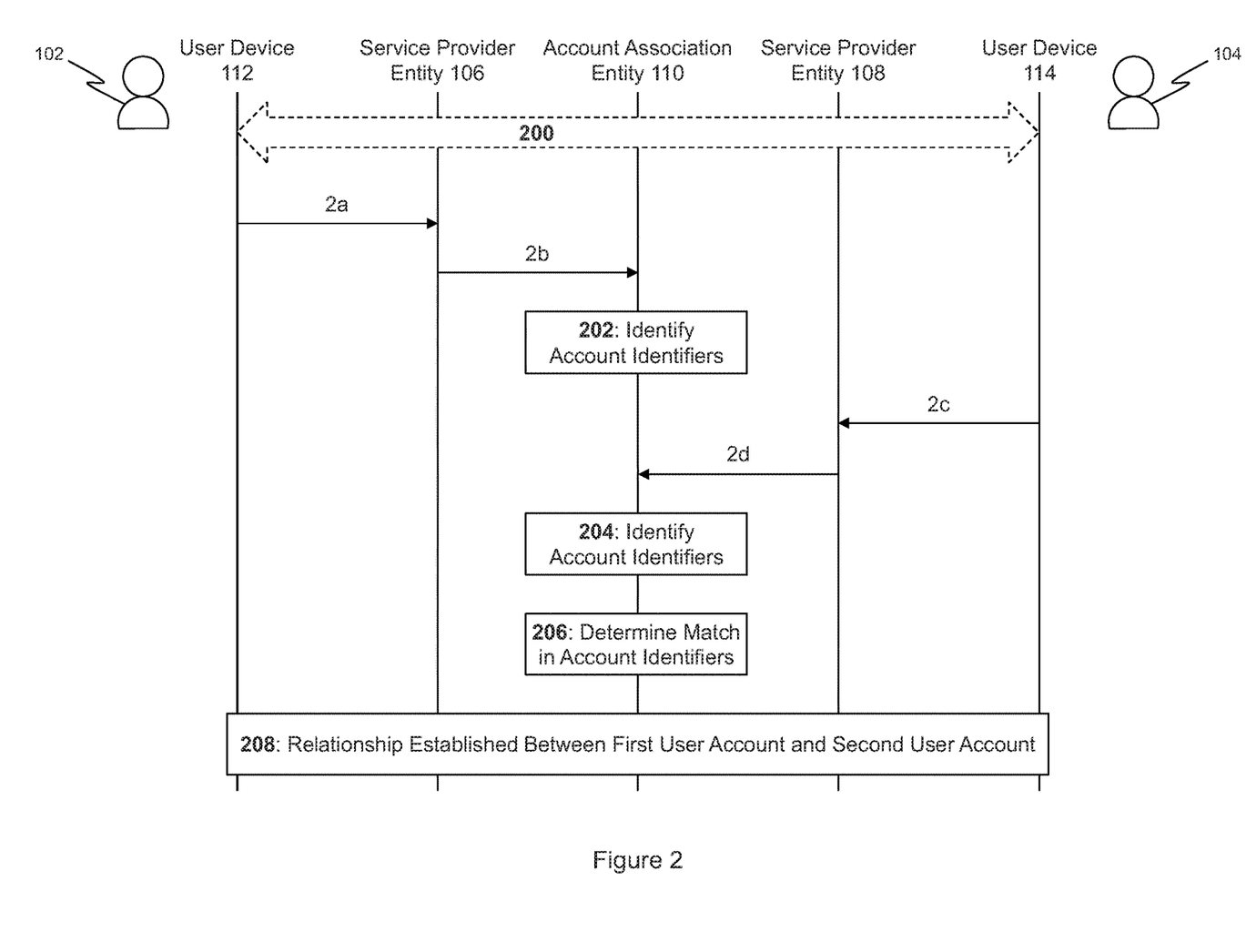
FIG. 2 shows a message flow diagram illustrating the operation of an account association entity for establishing relationships between user accounts according to embodiments.

FIG. 2 shows a message flow diagram illustrating the operation of account association entity 110 for establishing relationships between user accounts according to embodiments. At the beginning of the message flow, user 102 and user 104 undergo an exchange of account identification data via the communication channel between user device 112 and user device 114 as illustrated by step 200. This exchange of account identification data may for example comprise transmission of an account identification message from user device 112 to user device 114, which includes account identification data corresponding to the user account of user 102; and transmission of an account identification message from user device 114 to user device 112, which includes account identification data corresponding to the user account of user 104.

The exchange of account identification data illustrated at step 200 may comprise an exchange of email messages, short messaging service (SMS), multimedia messaging service (MMS) messages or other network based messaging protocols. In some embodiments, the exchange of account identification data may utilize a short range radio channel, such as NFC or an alternative short range channel, such as an optical recognition system for capturing computer readable image data (for example bar codes or QR codes). The physical proximity required for an exchange of account identification data via such a short range channel provides a user with assurance that received account identification data belongs to the expected user, and that the account identification data is unlikely to have been spoofed or intercepted and manipulated prior to receipt. In some arrangements, the exchange of account identification data may take place via a non-electronic medium, such as verbally, or in a form of written communication, and thereafter the received account identification data may be entered manually by each user 102, 104 via the user interface on their respective user device 112, 114. In some arrangements, the exchange of account identification data may be carried out over a secure communication channel with mutual entity authentication in order to provide both parties with assurance of each other's identity. Such a secure communication channel may incorporate the use of Hypertext Transfer Protocol Secure (HTTPS) or a secure email protocol, for example using PGP™.

Having received the account identification data corresponding to the user account of user 104 at user device 112 in step 200, user 102 may undertake an account association process with respect to the user account of user 104, by transmitting account association request message 2a from user device 112 to service provider entity 106. Account association request message 2a includes the account identification data corresponding to the user account of user 104 received at step 200. Prior to transmission of account association request message 2a, user 102 may have performed any necessary steps to gain access to their user account via user device 112. This account access procedure may comprise one or more authentication or verification messages being transmitted between user device 112 and service provider entity 106 (not shown).

In response to receipt of account association request message 2a, service provider entity 106 is configured to transmit account association request message 2b to service provider entity 110, which comprises the account identification data corresponding to the user account of user 104. Account association request message 2b also comprises sufficient data to identify the user account of user 102 to account association entity 110. For example, service provider entity 106 may insert an account identifier for the user account of user 102 account into account association request message 2b on the basis of a previous account access procedure performed by user 102 via user device 112.

Having received account association request message 2b, account association entity 110 is configured to identify a source account identifier and a target account identifier for account association request message 2b, as shown by step 202. This identification comprises parsing appropriate parameters from account association request message 2b. The source account identifier corresponds to the user account of the user from which the account association request message was received. In the case of account association request message 2b, the source account identifier corresponds to the user account of user 102 (also referred to hereinafter as the source account of account association request message 2b). The source account identifier may, for example, be identified by account association entity 110 on the basis of the account identifier inserted by service provider entity 106.

The target account identifier corresponds to the user account with which the user of the source account wishes to establish a relationship. In the case of account association request message 2b, the target account identifier corresponds to the user account of user 104 (also referred to hereinafter as the target account of account association request message 2b). The target account identifier is identified by account association entity 110 on the basis of the account identification data which is included in the account association request message.

Having received the account identification data corresponding to the user account of user 102 at user device 114 in step 200, user 104 may similarly undertake an account association process with respect to the user account of user 102. User 104 does this by transmitting account association request message 2c from user device 114 to service provider entity 108. Account association request message 2c includes the account identification data corresponding to the user account of user 102 received at step 200. Prior to transmission of account association request message 2c, user 104 may have also performed any necessary steps to gain access to their user account via user device 114.

In response to receipt of account association request message 2c, service provider entity 108 is configured to transmit account association request message 2d to account association entity 110, which comprises the account identification data corresponding to the user account of user 102. Account association request message 2d also comprises sufficient data to identify the user account of user 104 to account association entity 110. For example, service provider entity 108 may insert an account identifier for the user account of user 104 account into account association request message 2d on the basis of a previous account access procedure performed by user 104 via user device 114.

Having received account association request message 2d, account association entity 110 is configured to identify a source account identifier for account association request message 2d and a target account identifier for account association request message 2d, as shown by step 204. In the case of account association request message 2d, the source account identifier corresponds to the user account of user 104 (also referred to hereinafter as the source account of account association request message 2d), and the target account identifier corresponds to the user account of user 102 (also referred to hereinafter as the target account of account association request message 2d).

Having received account association request messages 2b and 2d, account association entity 110 is equipped to determine a match between their respective source and target account identifiers, as shown by step 206. In the embodiments shown in FIG. 2, such a match is determined by comparing the source account identifiers of each account association request message with the target account identifier of the other account association request message. Account association entity 110 determines that the source account identifier of account association request message 2b and the target account identifier of account association request message 2d relate to the same user account, i.e. the user account of user 102. Account association entity 110 further determines that the target account identifier of account association request message 2b and the source account identifier of account association request message 2d relate to the same user account, i.e. the user account of user 104.

On the basis of the determined match between the respective source and target identifiers of account association request messages 2b and 2d account association entity 110 is configured to establish a relationship between the user accounts of user 102 and user 104, as shown by step 208. Hence, a trusted relationship is established between the user accounts of user 102 and user 104, without requiring any information about either of the users to be revealed to the other user.

In some embodiments, establishment of the relationship at step 208 comprises adding account information for the user account of user 102 to the user account of user 104, and/or vice versa. For example, this may include adding an entry for the user account of user 102 to a list of contacts associated with the user account of user 104, and/or adding an entry for the user account of user 104 to a list of contacts associated with the user account of user 102. In the case of a banking system, the list of contacts may comprise a list of payees. In some embodiments, the account information for the user account of user 102 may be added to the user account of user 104 by service provider entity 108, for example in response to receipt of an account association update message (not shown) transmitted by account association entity 110. Similarly, the account information for the user account of user 104 may be added to the user account of user 102 by service provider entity 106.

In the event that the source and target identifiers of account association request messages 2b and 2d do not match, the account association process may be terminated and the relationship between the user accounts would not be established. Notifications may also be sent to one or both service provider entities 106, 108, for the purposes of anomaly detection and/or anti-fraud. In alternative arrangements, the account association process may not be terminated, and the account association may remain pending until a matching account association request message is received, at which point the account association process may be completed as described above. In some embodiments, a pending account association process may expire after a predetermined period of time, in order to mitigate the risks or computational overheads associated with pending account association processes. In such embodiments, after such a period of time has elapsed, the account association process is terminated. Upon termination of the account association process, an account association rejection message may be transmitted by account association entity 110 to the appropriate user device 112, 114 via the corresponding service provider entity 106, 108 in order to inform the respective user 102, 104 of the termination of the account association process.

In some arrangements, an identity verification process may be conducted prior to establishing the relationship between the user accounts, in order to ensure that users 102 and 104 both intended to establish the relationship with each other. Such an identity verification process may be particularly suitable in arrangements where the exchanged account identification data may have been compromised, for example if the account identification data was originally exchanged via an insecure communication channel. In such arrangements, the account identification data may be vulnerable to malicious manipulation by a so called "man in the middle" in order to cause a relationship to be established with an unintended user.

One such identity verification process may comprise account association entity 110 identifying an item of trusted profile identity information corresponding to user 104, for example by querying service provider entity 108. The item of profile identity information may include a name of user 104, a name of a business associated with user 104, a photograph of user 104, etc. That item of assured profile identity information is then transmitted to user device 112 in a profile information message (for example via service provider entity 106), whereby to reveal the item of profile identity information to user 102. User 102 may subsequently review the item of profile information for user 104 via user device 112, for example by viewing the item of profile information via a display on user device 112, or by listening to the item of profile information via a speaker on user device 112 etc., and verify that user 104 is the user with whom they intended to establish a relationship. User 102 may then respond to the profile information message by transmitting a profile information confirmation message to account association entity 110 (for example via service provider entity 106) via user device 112. Having received the profile identity confirmation message, the validity of the prospective relationship is confirmed to account association entity 110 from the perspective of user 102. Account association entity 110 may additionally repeat the identity verification process with respect to user 104 prior to establishing the relationship in order to obtain confirmation from both users as to the validity of the prospective relationship.

An alternative such identity verification process may comprise transmitting a profile information challenge message to user device 112 (e.g. via service provider 106), whereby to challenge user 102 to provide an item of profile identity information corresponding to the user with which they intended to establish a relationship. User 102 may then respond to the profile information challenge message, by transmitting the requested item of profile identity information back to account association entity 110 in a profile information response message. Account association entity 110 may then compare the received item of profile identity information with an item of trusted profile identity information corresponding to user 104 (which may have been obtained by querying service provider 108 for example). If the result of the comparison is to determine a match between the received item of profile identity information and the trusted item of profile identity information associated with user 104, the validity of the prospective relationship is confirmed to account association entity 110 from the perspective of user 102. Such embodiments prevent items of profile information for user 104 from being unnecessarily revealed to user 102. Again, account association entity 110 may additionally repeat the identity verification process with respect to user 104 prior to establishing the relationship in order to obtain confirmation from both users as to the validity of the prospective relationship.

In other arrangements, no identity verification process is conducted in order to maintain anonymity between user 102 and user 104.

In some embodiments, rather than requiring both users to independently submit account association request messages of their own volition, once the first account association request message has been received by account association entity 110 from one user, a query message may be sent to the other user in order to prompt for submission of the second account association request message. This embodiment will now be described with reference to FIG. 3. Steps 300 and 302, and account association request messages 3a and 3b are equivalent to the corresponding steps 200 and 202, and messages 2a and 2b as described in relation to FIG. 2. However, in the embodiments shown in FIG. 3, having identified the account identifiers for account association request message 3b in step 302, account association entity 110 is configured to transmit an account association query message using the identified target account identifier for account association request message 3b. The target account identifier for account association request message 3b corresponds to the user account of user 104. Therefore, account association entity 110 transmits account association query message 3c to the corresponding service provider entity 108. In response to receipt of account association query message 3c, service provider entity 108 is configured to transmit account association query message 3d to user device 114.

Figure 3:
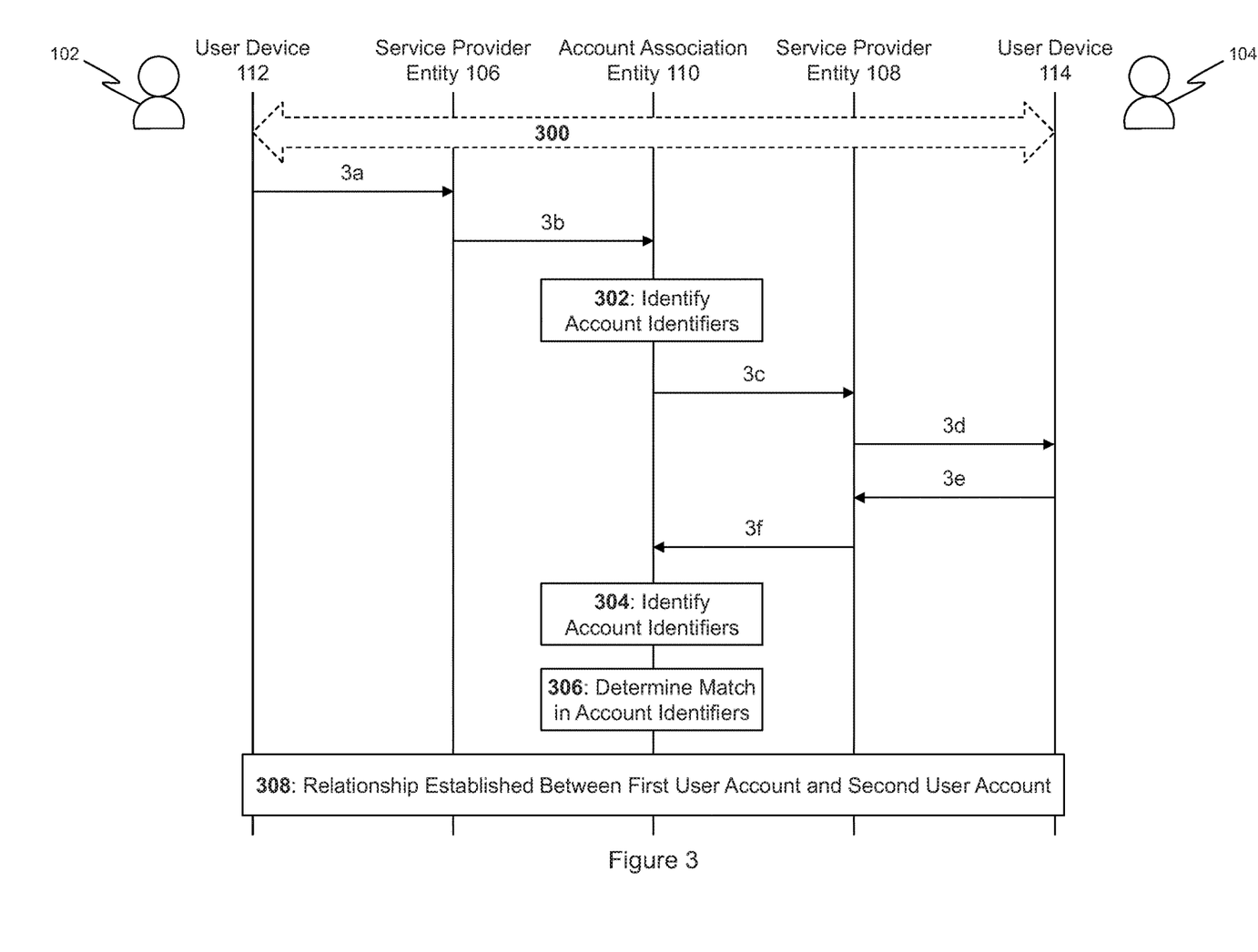
FIG. 3 shows a message flow diagram illustrating the operation of an account association entity for establishing relationships between user accounts according to alternative embodiments.

Having received account association query message 3d, user device 114 may be configured to prompt user 104 to transmit an account association request message, for example by triggering an alerting mechanism on user device 114. The alerting mechanism may for example comprise a visual alert, such as a notification or message displayed on a display of user device 114, an audio alert emitted via a loudspeaker on user device 114, or a tactile alert exhibited via a vibration function of user device 114. In alternative embodiments, user device 114 may be configured to transmit an account association request message without requiring input from user 104, for example by transmitting an account association request message for any received account identification data for which an account association request message has not yet been transmitted.

Therefore, in response to receipt of account association query message 3d, user device 114 transmits account association query message 3e to service provider entity 108. In the embodiments shown in FIG. 3, as a result of the exchange of account identification data in step 300, account association query message 3e includes account identification data corresponding to the user account of user 102. In response to receipt of account association query message 3e, service provider entity 108 is configured to transmit account association request message 3f to account association entity 110, which comprises the account identification data corresponding to the user account of user 102. Account association request message 3f also comprises sufficient data to identify the user account of user 104 to account association entity 110, as described previously in relation to FIG. 2. Having received account association request message 3f, account association entity 110 is configured to identify a source account identifier and a target account identifier for account association request message 3f, as shown by step 304. In the case of account association request message 3f, the source account identifier corresponds to the user account of user 104, and the target account identifier corresponds to the user account of user 102.

Having received account association request messages 3b and 3f, account association entity 110 is equipped to determine a match between their respective source and target account identifiers, as shown by step 308, and described previously. In some arrangements, account association entity 110 may identify that account association request message 3f was received in response to the transmission of account association query message 3c, and therefore assume that the source account identifier for account association request message 3f is the same as the target account identifier for account association request message 3b. Therefore, in such arrangements, the determination of a match performed at step 306 may merely comprise comparing the source account identifier of account association request message 3b with the target account identifier for account association request message 3f. On the basis of the determined match between the necessary source and target identifiers of account association request messages 3b and 3f, account association entity 110 is configured to establish a relationship between the user accounts of user 102 and user 104, as shown by step 308.

Hence, unnecessary delays in the account association process may be avoided by prompting for the required account association request messages. However, no user information need be revealed in the account association query message, and since the other party's account identification information is required in order to form a response that would lead to a relationship being established, such embodiments are resilient to the type of malicious activity which incorporates the transmission of spurious account association request messages, which is known to affect conventional request-response based account association systems.

It can be seen that the account association processes described above in relation to FIGS. 2 and 3 enable a mutually trusted relationship to be established. In addition, the risk associated with a transposition error occurring during manual entry of the account identification data is mitigated, because for a relationship to be established, the user of the erroneously entered user account would be required to also submit an account association request message, and make a corresponding transposition error in their included account identification data. The likelihood of two users making corresponding errors is significantly lower than that of a single transposition error occurring.

In the previously described embodiments, communications between user devices 112, 114, and account association entity 110 have been transmitted via the corresponding service provider entity. In alternative embodiments, one or more of user devices 112 and 114 may undertake at least a portion of the aforesaid communications directly with account association entity 110, for example via the internet. In such embodiments, the source account identifier for a particular account association request message may be determined by account association entity 110 on the basis of having received the message from the corresponding user, for example by querying a service provider entity.

Account identification data exchanged between the users, and included in subsequent account association request messages, may comprise any form of data which is understandable to account association entity 110 and can be used to identify the corresponding user account. Such account identification data may for example comprise an account number, a user identifier (or alias), an email address, a telephone dialing number, etc.

In some arrangements, the account identification data exchanged by users 102 and 104 comprises an electronic token. In such arrangements, account association entity 110 is configured to process association requests on the basis such electronic tokens. In order to facilitate the exchange of tokens between users, users are able to retrieve tokens from account association entity 110 which uniquely identify a given one of their user accounts to account association entity 110. That user is then able to distribute the token to other users of the account based system, for example as part of an exchange of account identification data, so that the other users are able to include the token in a subsequent account association request message.

Figure 4:
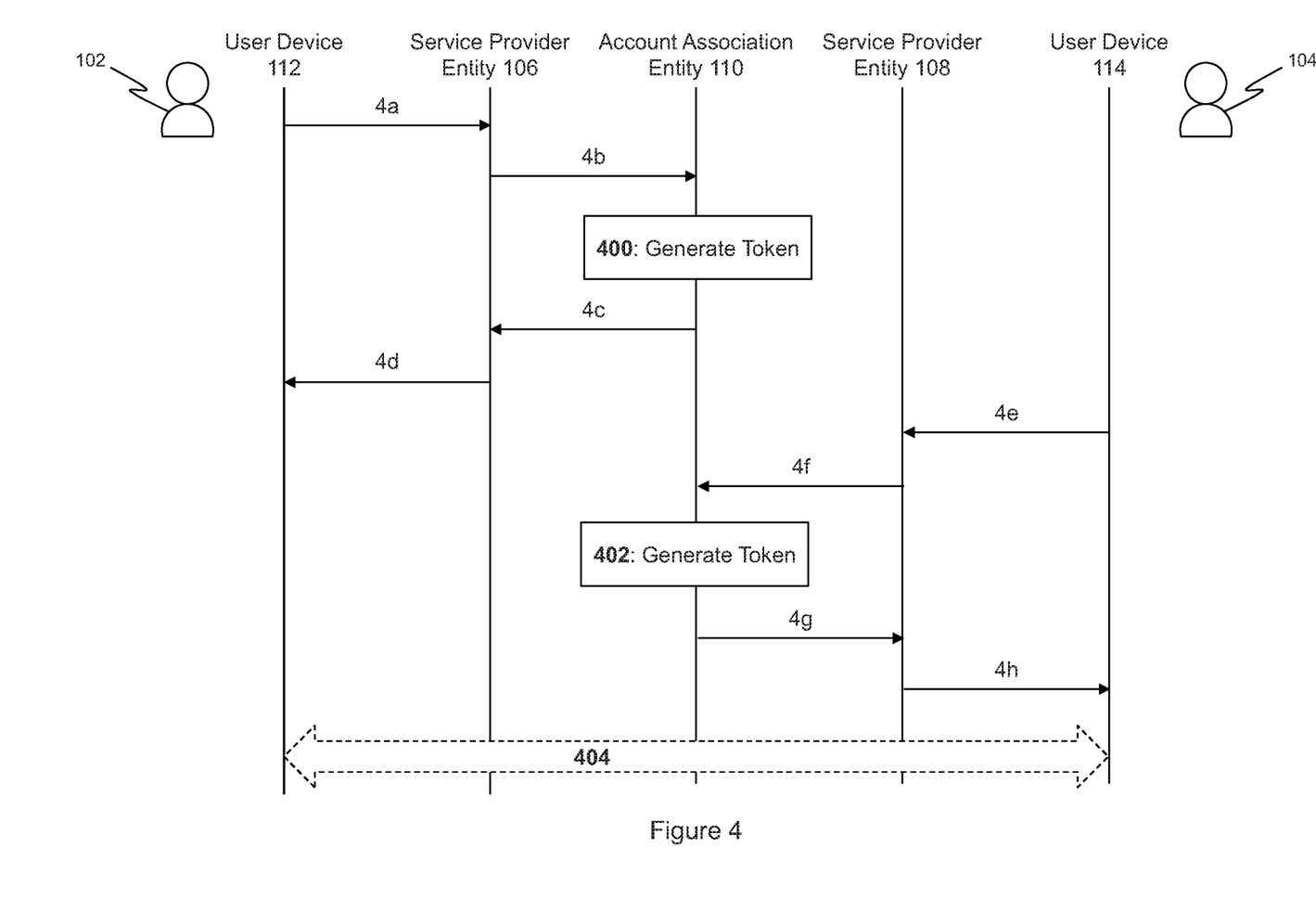
FIG. 4 shows a message flow diagram illustrating the operation of an account association entity for generating tokens according to embodiments.

FIG. 4 shows a message flow diagram illustrating the operation of account association entity 110 for generating tokens according to embodiments. Users 102 and 104 wish to exchange account identification information, in this case in the form of electronic tokens, in order to facilitate the establishment of a mutual relationship, for example as previously described in relation to FIG. 2 or 3. Prior to the beginning of the message flow, users 102 and 104 may have performed any necessary steps to gain access to their user accounts via user devices 112, 114. This account access procedure may involve transmission of one or more authentication or verification messages (not shown) between user devices 112, 114 and service provider entities 106, 108.

User 102 initiates a token process with account association entity 110 by transmitting token request message 4*a* to service provider entity 106, via user device 112, in relation to their user account. If user 102 holds multiple user accounts, their particular user account may be identified as a result of a previous account access procedure performed by user 102, or by including an identifier for that user account in token request message 4*a*. In response to receipt of token request message 4*a*, service provider entity 106 is configured to transmit token request message 4*b* to account association entity 110. In embodiments, token request message 4*b* comprises an identifier for the user account of user 102. Having received token request message 4*b*, account association entity 110 is configured to generate a token for the user account of user 102 at step 400. The token is then transmitted to service provider entity 106 in token response message 4*c*. In response to receipt of token response message 4*c*, service provider entity 106 is configured to transmit token response message 4*d*, which includes the token for the user account of user 102, to user device 112. Thereafter, user 102 is equipped to distribute the token for their user account to other users.

Similarly, user 104 initiates a further token process with account association entity 110 by transmitting token request message 4*e* to service provider entity 108, via user device 114, in relation to their user account. In response to receipt of token request message 4*e*, service provider entity 108 is configured to transmit token request message 4*f* to account association entity 110. In embodiments, token request message 4*f* comprises an identifier for the user account of user 104. Having received token request message 4*f*, account association entity 110 is configured to generate a token for the user account of user 104 at step 402. This token is then transmitted to service provider entity 108 in token response message 4*g*. In response to receipt of token response message 4*g*, service provider entity 108 is configured to transmit token response message 4*h*, which includes the token for the user account of user 104, to user device 114. Thereafter, user 104 is equipped to distribute the token for their user account to other users.

Having each received their tokens at their respective user devices, users 102 and 104 are able to conduct an exchange of account identification information at step 404. In the embodiments depicted in FIG. 4, the exchange of account identification information comprises transmission of an account identification message from user device 112 to user device 114 which includes the electronic token corresponding to the user account of user 102, and transmission of an account identification message from user device 114 to user device 112 which includes the electronic token corresponding to the user account of user 104. Thereafter, each user is equipped to initiate an account association process for establishing a relationship between the two user accounts, which may then be completed as in the previously described embodiments. In such arrangements, the target account identifiers are each determined by account association entity 110 on the basis of the electronic token received in the respective account association request message.

In one arrangement the tokens comprise data stored in a form that is intended to be understood only by account association entity 110. For example, the token may comprise an alphanumeric data string. Further, the token may be stored in the form of an image, such as a bar code, which may then be read by a suitable barcode scanner on the other user's device during the exchange of account identification information. The account association entity may generate tokens with arbitrary content in response to receipt of a token request message, and store a mapping between the generated token and the corresponding user account that can be queried later upon receipt of an account association request message comprising the token.

In alternative embodiments, at least a portion of the token is encrypted, for example the token may comprise an encrypted identifier for the corresponding user account, which is intended to be decrypted only by account association entity 110. By utilizing tokens as the basis of the account association process, the difficulty associated with transmitting unsolicited association request messages is increased because a user requires the other user's token to be able to do so (or must be able to guess it). Additionally, the need for a user to disclose their actual account details during an exchange of account identification information is removed, which the user may prefer to keep private. In further embodiments, at least a portion of the token may be cryptographically signed in order to provide authenticity and/or non-repudiation. In some such embodiments, the contents of the token may be hashed prior to being cryptographically signed, thereby preventing retrieval and forgery of the contents of the token by third parties. Hashing the contents of the token may also serve to reduce the size of the token. In some arrangements, one token may be associated with a group of user accounts, wherein relationships are established with all of the associated user accounts upon completion of the account association process. Further, a token may subsequently be used to remove one or more associations with a given user account that were established on the basis of that token.

Once a token has been generated for the given user account, the same token may be provided thereafter for all requests in relation to that user account. In alternative embodiments, a new, different token may be generated each time a token is requested in relation to the given user account. For example, a token request message may be transmitted in response to user input on the relevant user device indicating that an exchange of account identification information is about to be undertaken, or in response to a request from another user to exchange account identification information. Such tokens may be use-limited, wherein account association entity 110 is configured to only process a single account association request (or a small number of account association requests) which use a given token. Thereafter, further association requests received by account association entity 110 that comprise the same token may be rejected by account association entity 110. This use limitation of the generated tokens serves to prevent the token being later acquired by a third party and used to initiate an account association request message in relation to the given user account.

Additionally or alternatively, such tokens may be time stamped by account association entity at the time of generation, or at the time they are supplied to the given user. Time stamping may comprise associating one or more of a time and a date with the generated token. The generated token may comprise the associated time and/or date. In further embodiments, the time stamp may be stored in memory by account association entity 110 alongside the generated token, or an identifier for the generated token. Associating a time stamp with the generated token allows the tokens to be time limited. Such time limited tokens may be required to be used in an account association request message within a predetermined timeframe, or thereafter be rejected by account association entity 110. This use limitation of the generated tokens again serves to prevent the token being later acquired by a third party and used to initiate an account association request message in relation to the corresponding user account.

The example embodiments described above can be implemented in many ways, such as program instructions stored in memory that are configured for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices. In a particular arrangement, computer readable instructions cause a standard processor, or a set of standard processors, to be configured to perform the routines according to embodiments disclosed herein.

The above embodiments are to be understood as illustrative examples of the invention. Further embodiments of the invention are envisaged. For example, instead of undergoing a device-to-device exchange of account identification data, each user may retrieve account identification data for the other user from a repository of identification data accessible via a network such as the internet. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method, comprising:

receiving, by an account association entity server, a first account association request message in relation to a first user account from a first user device of a first user in an account based system, the first account association request message comprising account identification data corresponding to a second user account in the account based system, the account identification data corresponding to the second user account being an e-mail address or a phone number of a second user;

identifying, by the account association entity server, on the basis of first account association request message, a first source account identifier which corresponds to the first user account and a first target account identifier which corresponds to the second user account, wherein the first target account identifier is identified using the e-mail address or the phone number of the second user;

receiving, by the account association entity server, a second account association request message in relation to the second user account from a second user device of the second user, the second account association request message comprising account identification data corresponding to the first user account, the account identification data corresponding to the first user account being an e-mail address or a phone number of the first user;

identifying, by the account association entity server, on the basis of the second account association request message, a second source account identifier which corresponds to the second user account and a second target account identifier which corresponds to the first user account, wherein the second target account identifier is identified using the e-mail address or the phone number of the first user;

having received the first account association request message and the second account association request message;

determining a match between the first source account identifier and the second target account identifier, and determining a match between the second source account identifier and the first target account identifier; and on the basis of the determined matches between the first source account identifier and the second target account identifier, and between the second source account identifier and the first target account identifier, establishing a relationship between the first user account and the second user account, wherein establishing the relationship comprises:

without revealing account information for the first user account to the second user, adding the account information for the first user account to the second user account by adding an entry for the first user account to a list of payees associated with the second user account; and without revealing account information for the second user account to the first user, adding account information for the second user account to the first user account by adding an entry for the second user account to a list of payees associated with the first user account, wherein the first user account is a first user bank account and the second user account is a second user bank account, and wherein the account identification data corresponding to the first user account was obtained by the second user device from the first user device over a communication channel that uses a packet-based network or a cellular communication network before the second account association request message is received by the account association entity server.

2. The method of claim 1, comprising transmitting, in response to receipt of the first account association request message, an account association query message, wherein the second account association request message is received in response to transmission of the account association query message, wherein the account association query message is transmitted using the first target account identifier.

3. The method of claim 1, wherein the first user device is a first mobile phone and the second user device is a second mobile phone.

4. The method of claim 1, comprising performing an identity verification process in response to said determining, wherein the establishment of the relationship between the first user account and the second user account is performed on the basis of the identity verification process.

5. Apparatus comprising a processing system comprising:
a processor; and
a computer readable medium, the computer readable medium comprising instructions, executable by the processor, to cause the processing system to:
receive a first account association request message in relation to a first user account from a first user device of a first user in an account based system, the first account association request message comprising account identification data corresponding to a second user account in the account based system, the account identification data corresponding to the second user account being an e-mail address or a phone number of a second user;
identify, on the basis of the first account association request message, a first source account identifier which corresponds to the first user account and a first target account identifier which corresponds to the second user account, wherein the first target account identifier is identified using the e-mail address or the phone number of the second user;

receive a second account association request message in relation to the second user account from a second user device of the second user, the second account association request message comprising account identification data corresponding to the first user account, the account identification data corresponding to the first user account being an e-mail address or a phone number of the first user;

identify, on the basis of the second account association request message, a second source account identifier which corresponds to the second user account and a second target account identifier which corresponds to the first user account, wherein the second target account identifier is identified using the e-mail address or the phone number of the first user;

having received the first account association request message and the second account association request message:

determine a match between the first source account identifier and the second target account identifier, and determining a match between the second source account identifier and the first target account identifier; and on the basis of the determined matches between the first source account identifier and the second target account identifier, and between the second source account identifier and the first target account identifier, establish a relationship between the first user account and the second user account, wherein establishing the relationship comprises:

without revealing account information for the first user account to the second user, adding the account information for the first user account to the second user account by adding an entry for the first user account to a list of payees associated with the second user account; and without revealing account information for the second user account to the first user, adding account information for the second user account to the first user account by adding an entry for the second user account to a list of payees associated with the first user account, wherein the first user account is a first user bank account and the second user account is a second user bank account, and wherein the account identification data corresponding to the first user account was obtained by the second user device from the first user device over a communication channel that uses a packet-based network or a cellular communication network before the second account association request message is received by the apparatus.

6. A non-transitory computer readable medium comprising a computer program comprising a set of instructions, which, when executed by a computing device, causes the computing device to perform the steps of:

receiving a first account association request message in relation to a first user account from a first user device of a first user in an account based system, the first account association request message comprising account identification data corresponding to a second user account in the account based system, the account identification data corresponding to the second user account being an e-mail address or a phone number of a second user;

identifying, on the basis of the first account association request message, a first source account identifier which corresponds to the first user account and a first target account identifier which corresponds to the second user account, wherein the first target account identifier is identified using the e-mail address or the phone number of the second user;

receiving a second account association request message in relation to the second user account from a second user device of the second user, the second account association request message comprising account identification data corresponding to the first user account, the account identification data corresponding to the first user account being an e-mail address or a phone number of the first user;

identifying, using the account identification data corresponding to the first user account in the second account association request message, a second source account identifier which corresponds to the second user account and a second target account identifier which corresponds to the first user account, wherein the second target account identifier is identified using the e-mail address or the phone number of the first user;

having received the first account association request message and the second account association request message;

determining a match between the first source account identifier and the second target account identifier, and determining a match between the second source account identifier and the first target account identifier; and on the basis of the determined matches between the first source account identifier and the second target account identifier, and between the second source account identifier and the first target account identifier, establishing a relationship between the first user account and the second user account, wherein establishing the relationship comprises:

without revealing account information for the first user account to the second user, adding the account information for the first user account to the second user account by adding an entry for the first user account to a list of payees associated with the second user account; and without revealing account information for the second user account to the first user, adding account information for the second user account to the first user account by adding an entry for the second user account to a list of payees associated with the first user account, wherein the first user account is a first user bank account and the second user account is a second user bank account, and wherein the account identification data corresponding to the first user account was obtained by the second user device from the first user device over a communication channel that uses a packet-based network or a cellular communication network before the second account association request message is received by the computing device.

* * * * *